Dec. 3, 1963 R. W. BOGAN ET AL 3,112,871

TAPE FEED MECHANISM FOR A RECORDING DEVICE

Original Filed Aug. 5, 1959 9 Sheets-Sheet 1

INVENTORS
ROBERT W. BOGAN
MACK C. GOODWIN
BY Gordon R. Sanborn
ATTORNEY

INVENTORS
ROBERT W. BOGAN
MACK C. GOODWIN
BY Gordon R. Sanborn
ATTORNEY

TAPE FEED MECHANISM FOR A RECORDING DEVICE

Original Filed Aug. 5, 1959 9 Sheets-Sheet 3

INVENTORS
ROBERT W. BOGAN
MACK C. GOODWIN
BY Gordon A. Sanborn
ATTORNEY

Dec. 3, 1963 R. W. BOGAN ETAL 3,112,871

TAPE FEED MECHANISM FOR A RECORDING DEVICE

Original Filed Aug. 5, 1959 9 Sheets-Sheet 8

3,112,871

TAPE FEED MECHANISM FOR A RECORDING DEVICE

Robert W. Bogan, Roseville, and Mack C. Goodwin, Bloomfield Hills, Mich., assignors to Burroughs Corporation, Detroit, Mich., a corporation of Michigan Original application Aug. 5, 1959, Ser. No. 831,737. Divided and this application Sept. 10, 1962, Ser. No. 222,573
5 Claims. (Cl. 234—129)

Figure 1:
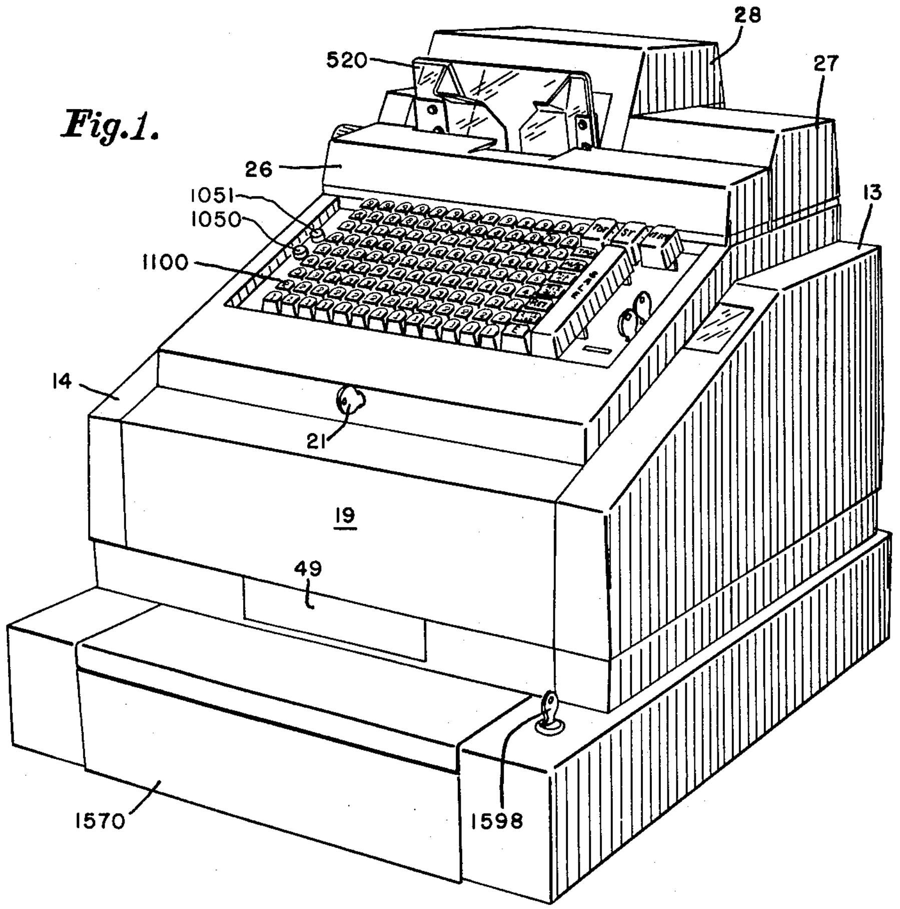

The present invention relates to a recording apparatus and more particularly to an improved perforating apparatus in combination with a tape feed apparatus wherein a large number of columns of information can be simultaneously recorded by the perforating apparatus and wherein the tape feed mechanism will operate to accurately advance the tape by a large number of columnar positions to a new position for the subsequent accurate recording of a new block of information.

This application is a division of the copending application of Bogan et al., Serial No. 831,737, filed on August 5, 1959, and titled "Combined Calculating and Punching Machine." This application is directed specifically to the perforating apparatus and particularly to the tape feed mechanism associated therewith which is illustrated in said parent application of Bogan et al.

In those recording devices wherein a large number of columns of information are simultaneously recorded on a strip of tape or other record material, such as for example in those devices commonly known as "parallel recording devices," the tape feed apparatus must be capable of accurately feeding a relatively long section of tape very rapidly from the tape supply reel to an accurate position in the punch throat. The accuracy of the tape feed mechanism is extremely critical in such devices when rolls of tape which do not have the feed holes preperforated therein are used since any misalignment of the sections of tape with the perforating apparatus tends to cause an accumulative error in regards the perforation of the feed holes.

Therefore it is an object of the present invention to provide an improved perforating apparatus in combination with an improved tape feed mechanism which is adapted to rapidly and accurately sequentially advance pieces of record material to a recording position. It is a further object of the present invention to provide an improved tape feed apparatus which is adapted to advance a strip of record material in a manner such that feed holes for the tape can be perforated without causing accumulated errors in such feed holes.

These objects are accomplished in accordance with the present invention by means of a record feed apparatus wherein predetermined lengths of record material are removed from a storage reel and stored in the form of a "loop" prior to the start of each record feeding operation. Thereafter, when a previous section of tape has been perforated, the loop of material is advanced into the recording position while the previously recorded material is wound upon a storage or takeup reel. Therefore it is seen that during the actual movement of a new section of record material into recording position only the mass of the new material must be moved and hence rapid and accurate movement thereof can be accomplished. To further control the accuracy of the advanced material and hence prevent the need for the use of record material having the feed holes preperforated therein, the apparatus of the present invention is adapted to over-feed the new material and then prior to the actual recording of information thereon the record material is moved in the reverse direction to an accurate position of alignment.

Figure 2:
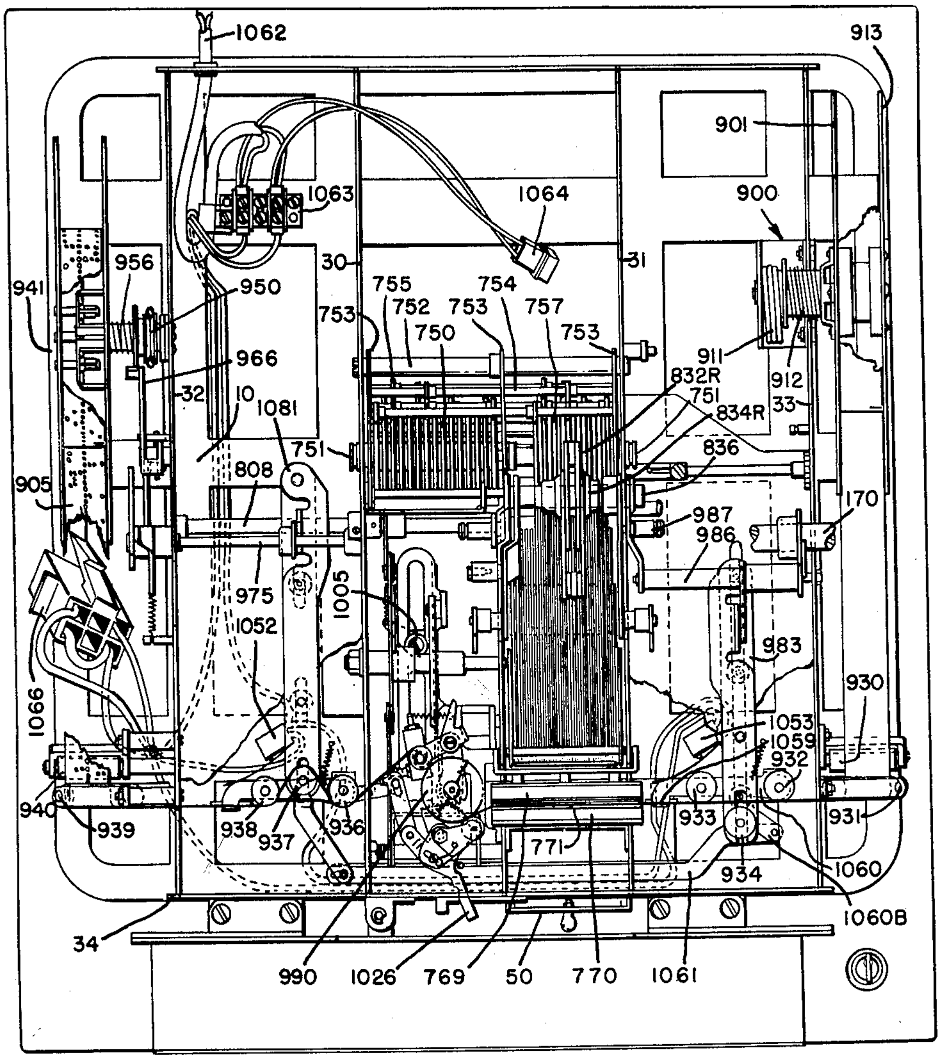
Figure 2A:
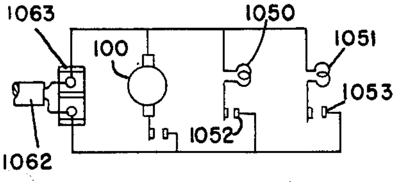
Figure 3:
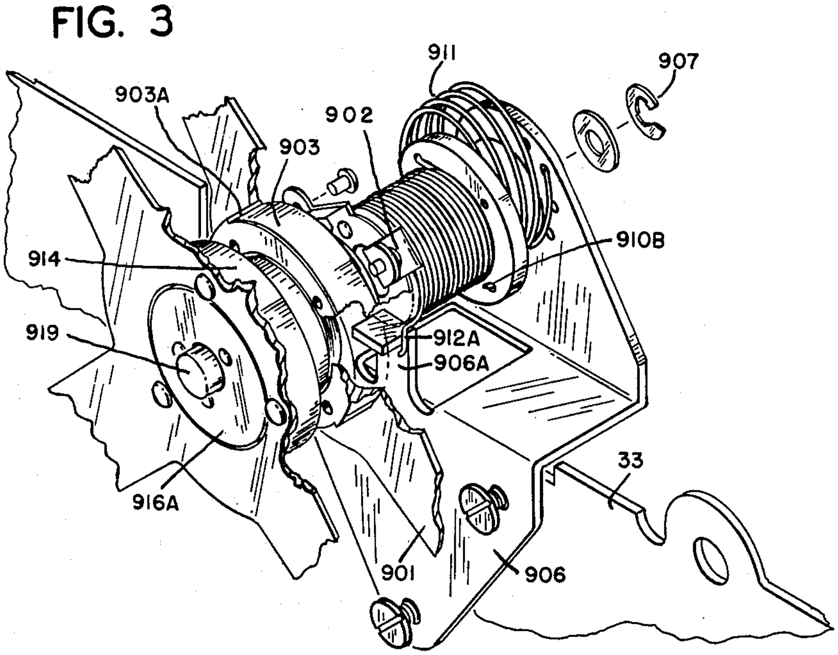
Figure 3A:
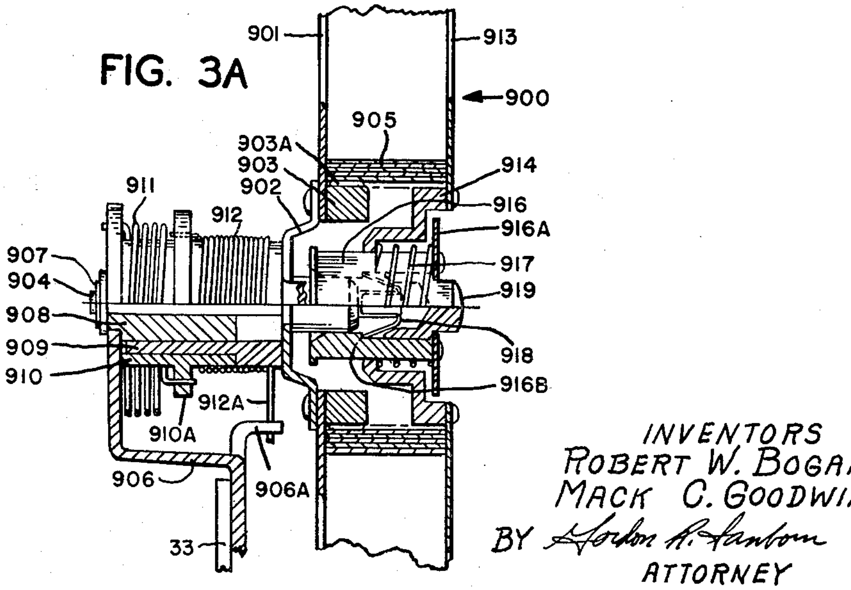
Figure 4:
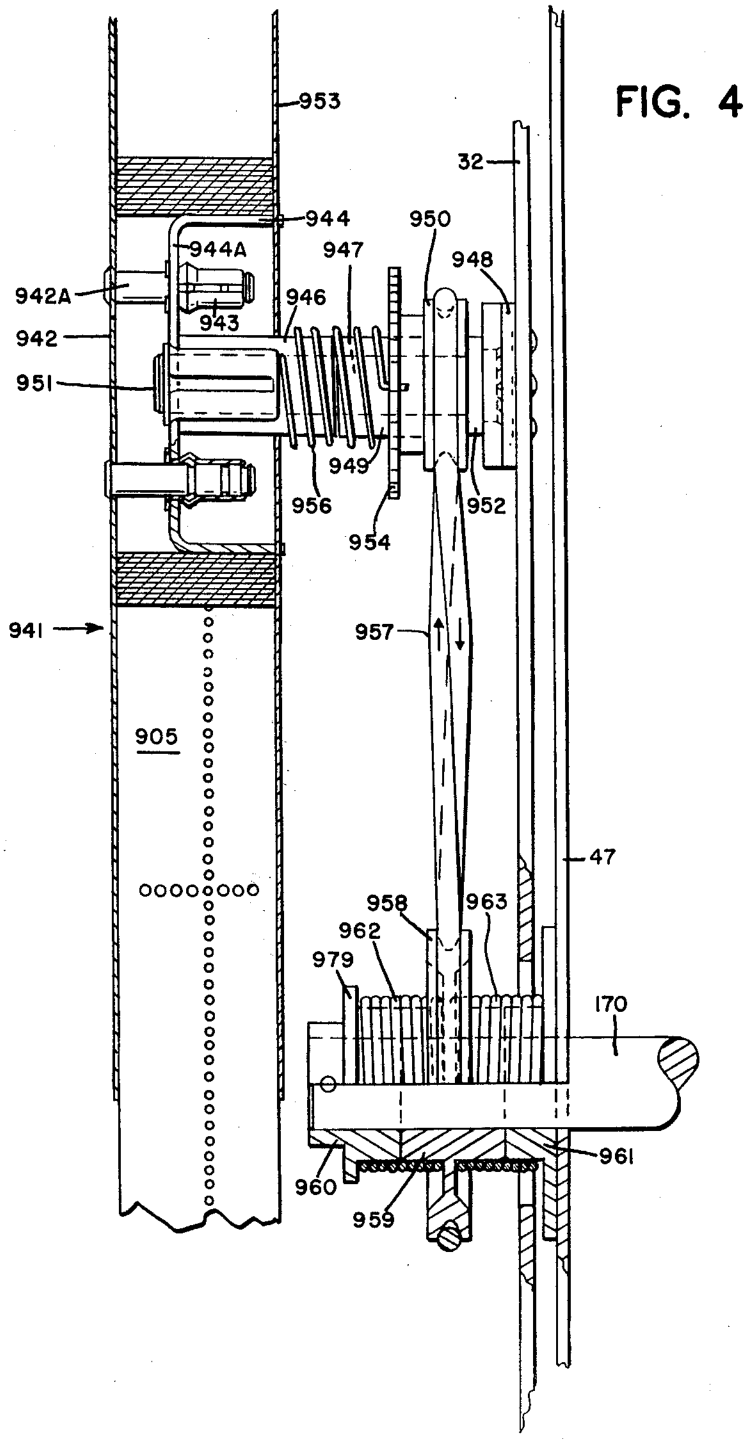
Figure 5:
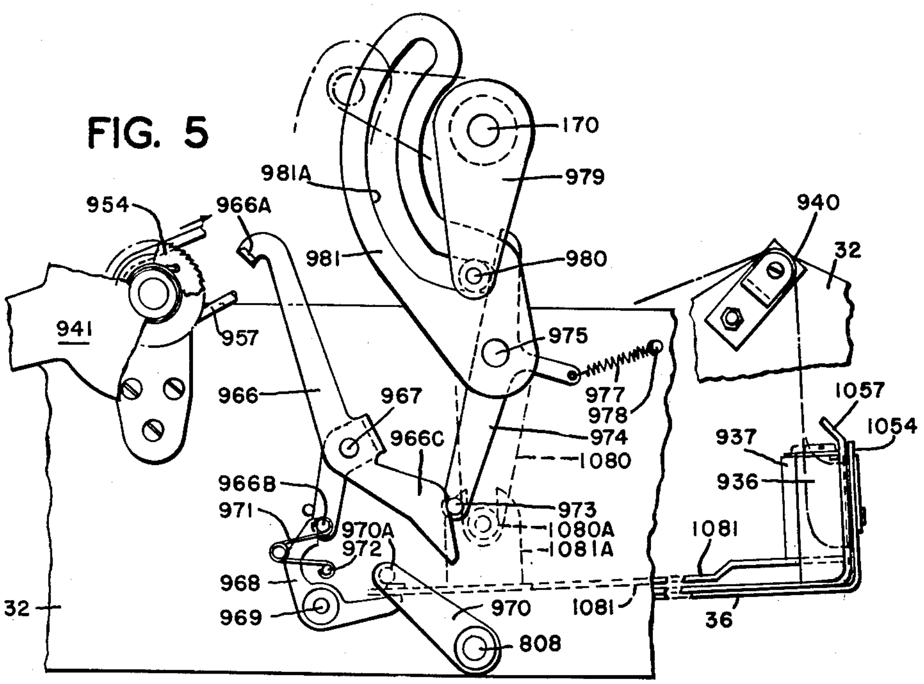
Figure 6:
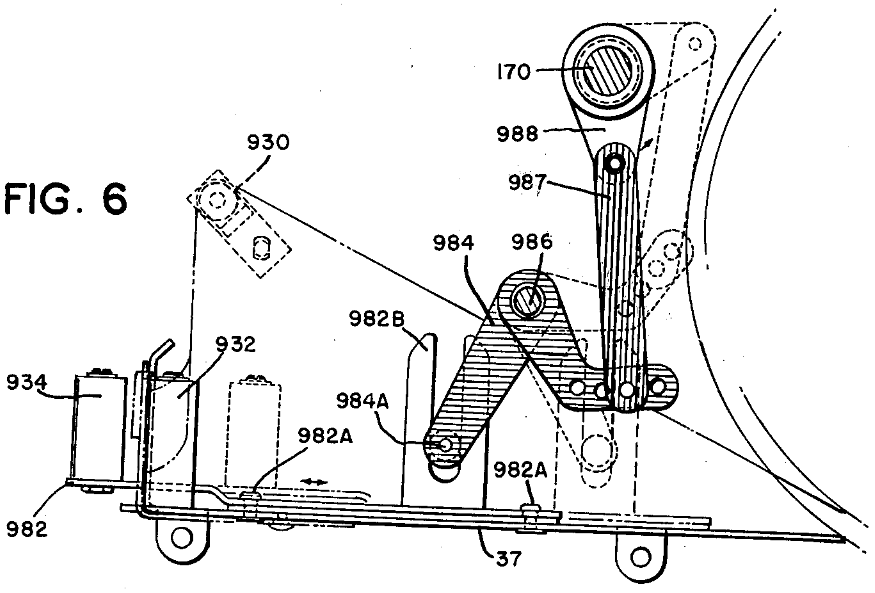
Figure 7:
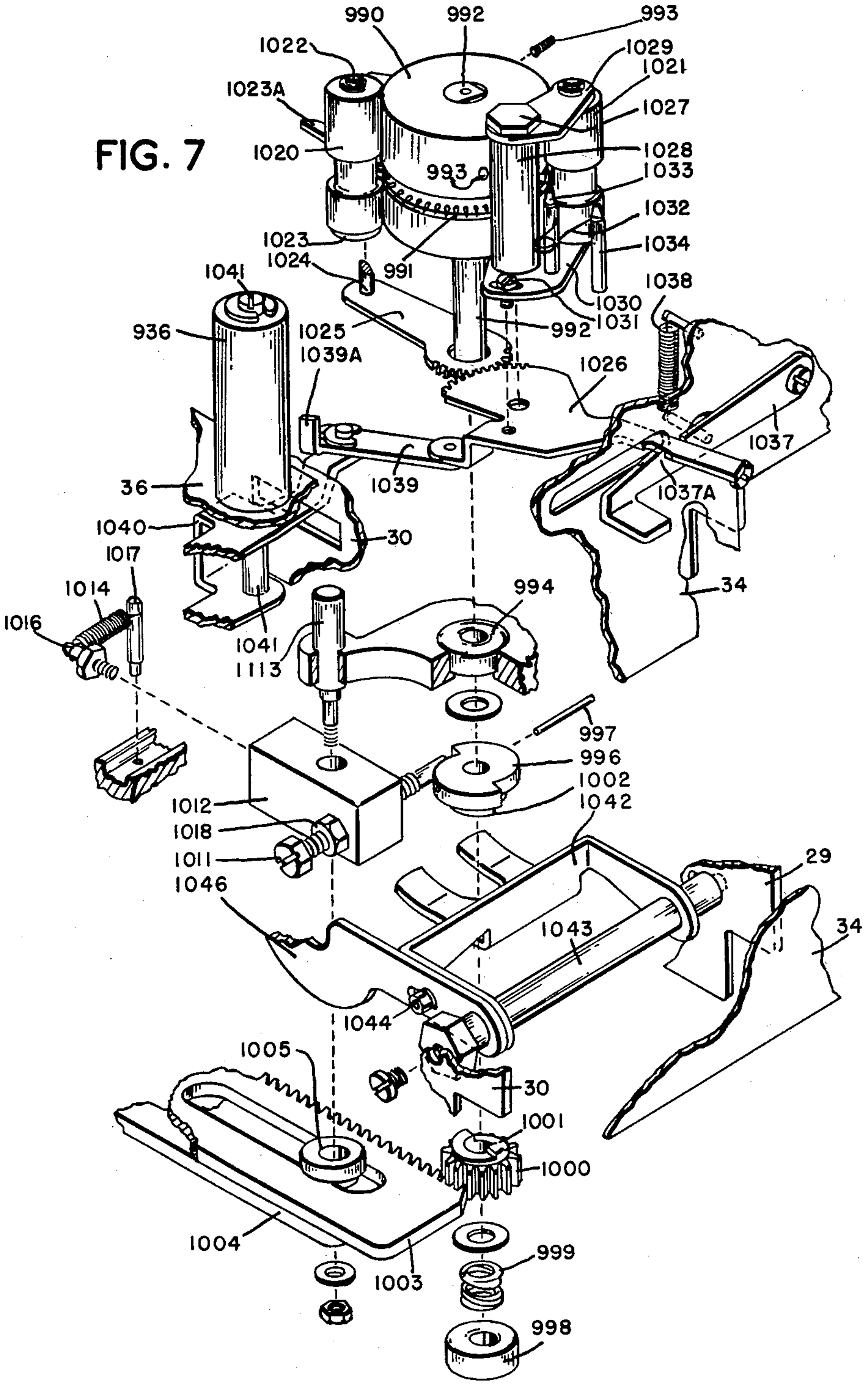

The above and other objects and advantages of this invention will be more clearly understood from the following description when read with reference to the accompanying drawings wherein, FIG. 1 is a perspective view of the machine described in detail in the above-identified parent application and embodying the features of the present invention, FIG. 2 is a plan view of the tape perforating and tape feeding apparatus chosen for the purpose of illustrating the present invention and as embodied in the above-identified machine, FIG. 2A is a schematic circuit diagram of one circuit adapted to indicate a break in the record material and also for supplying electrical energy to the motor of the machine, FIG. 3 is a perspective view from the upper right rear corner of the tape supply reel and tension mechanism with portions broken away to expose the details thereof, FIG. 3A is a front elevation and partial section of the tape supply reel and tension mechanism of FIG. 3 with a section through the lower half of the reel and tension mechanism, FIG. 4 is a plan view of the tape takeup reel and drive mechanism therefor, FIG. 5 is a left elevation of the mechanism disposed to the left of the punch block and adapted to facilitate rapid feeding of the perforated tape, FIG. 6 is an elevation from the right illustrating the stripping mechanism for removing tape from the supply reel, FIG. 7 is a partially exploded view showing the details of a tape feed drum used for advancing tape through the punch block.

Figure 8:
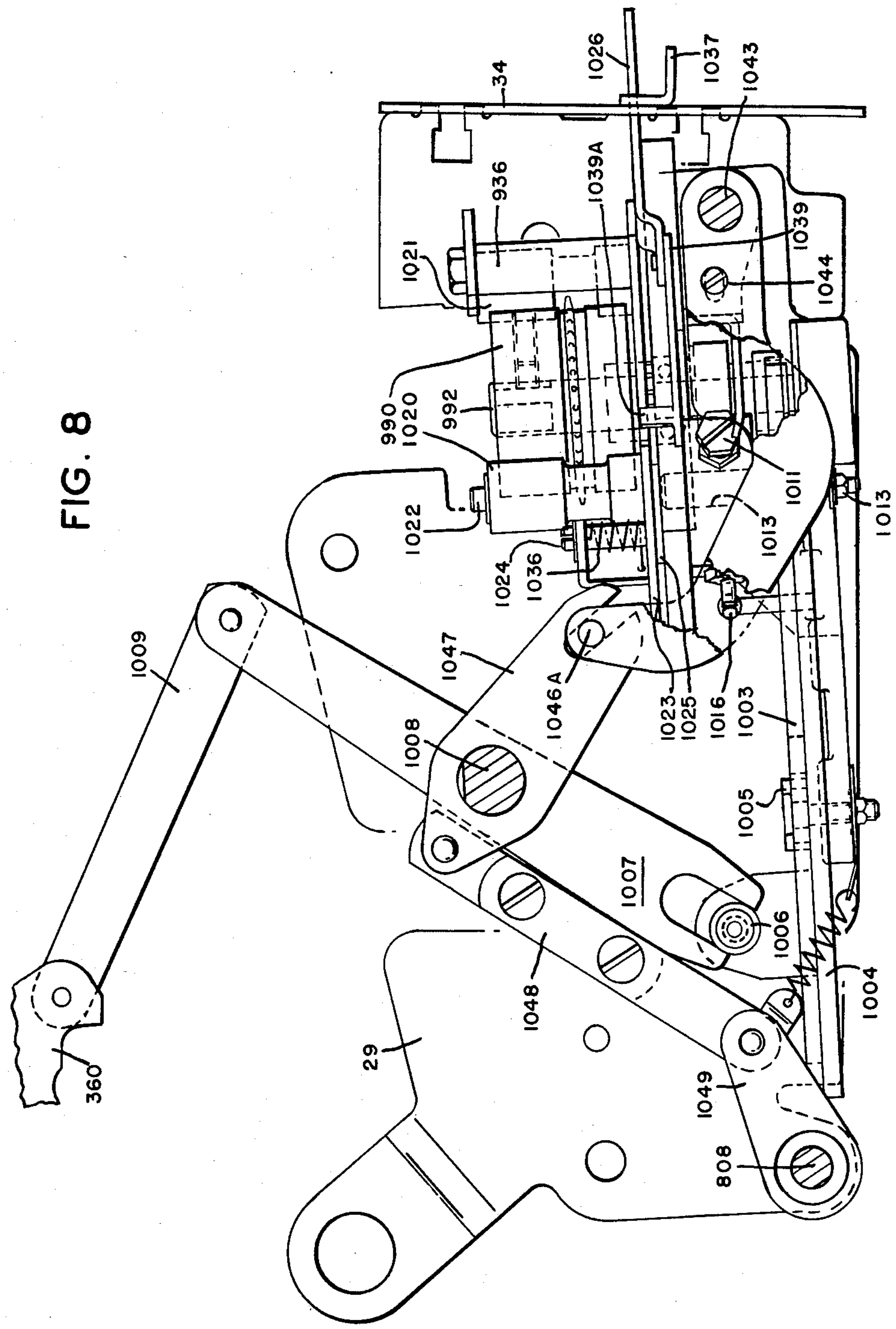
Figure 9:
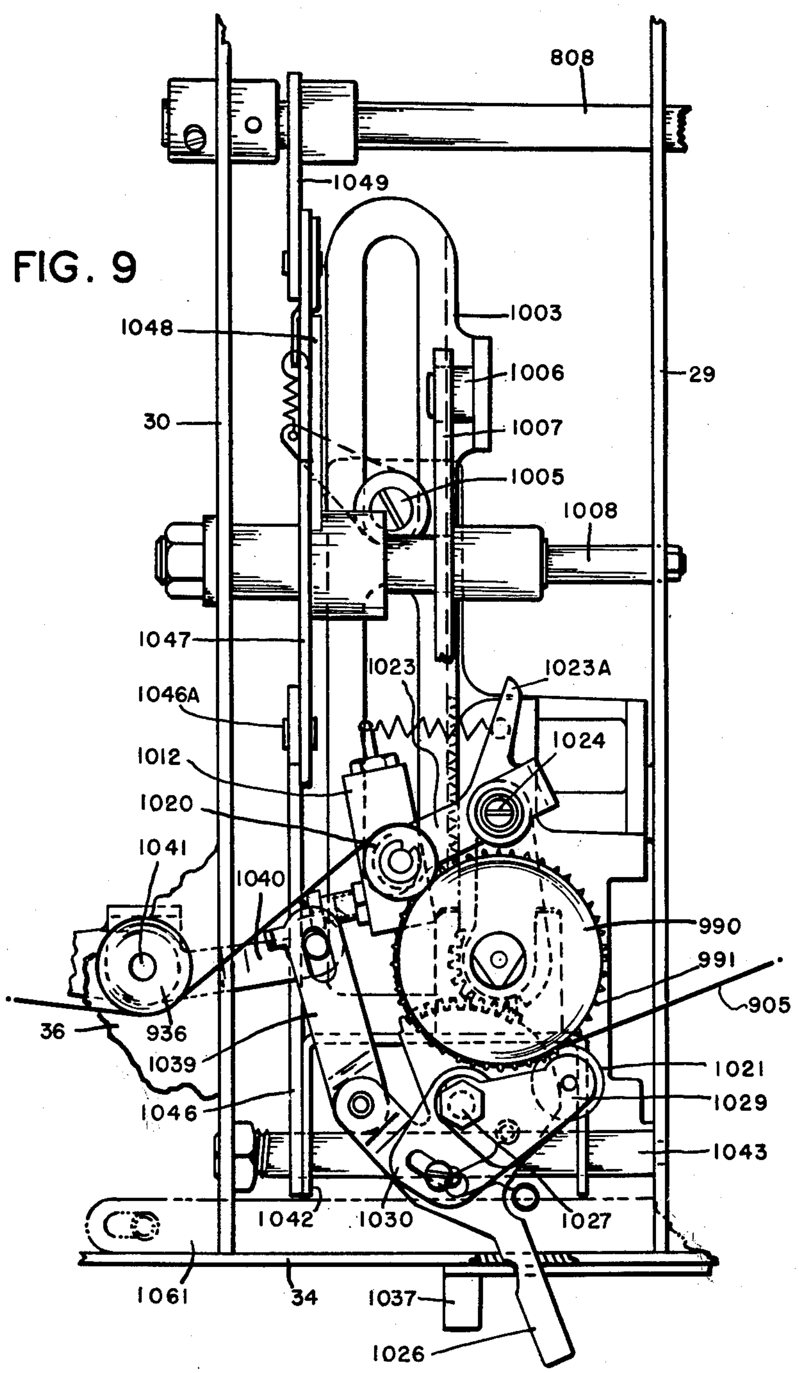
Figures 10, 10A, 11:
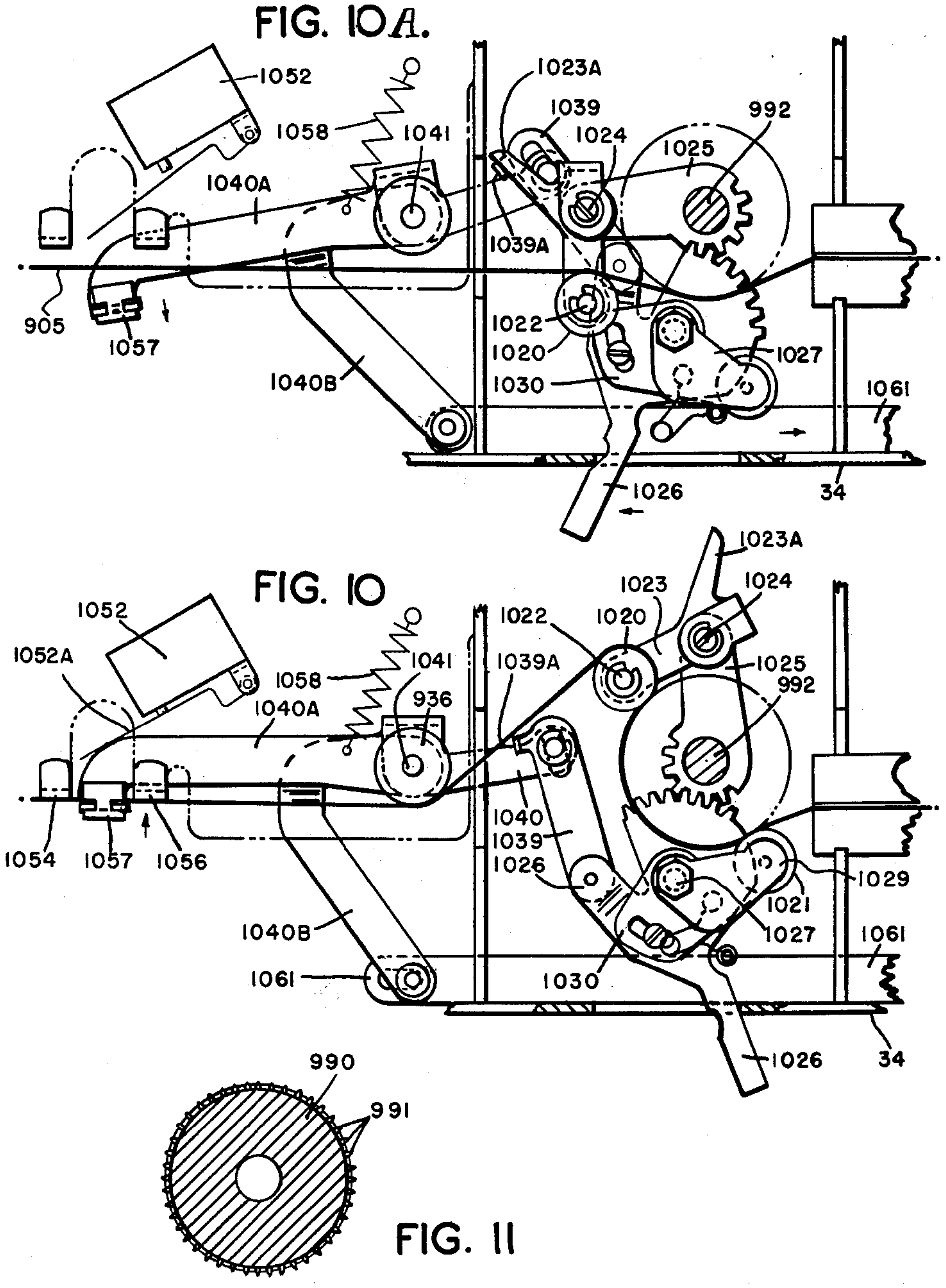

FIG. 8 is a left elevation of the mechanism for driving the tape feed drum,

FIG. 9 is a plan view of the tape feed drum and pressure rolls associated therewith for holding the perforated tape against the drum, FIG. 10 is a plan view of the pressure rolls for holding the tape against the feed drum with the parts in their normal positions and including the manual lever for controlling the rolls, FIG. 10A is a plan view of the parts shown in FIG. 10 but with the pressure rolls moved away from the tape feed drum to illustrate the manner of inserting a new tape, and FIG. 11 is a horizontal section of the tape feed drum showing the feed pins extending radially therefrom.

As described in detail in the above-identified parent application of Bogan et al. the machine of FIG. 1 is adapted to simultaneously record 22 columns of information during each machine cycle. Accordingly the tape supply mechanism must be capable of rapidly moving the tape by large increments in short periods of time in order that the machine speed is not reduced. Such rapid movement of a new section of tape to the perforating apparatus normally necessitates a rapid removal of tape from the supply reel and hence tends to accelerate the supply reel to a high angular velocity and hence produce an overthrow of tape from the supply reel. To prevent such overthrow the tape supply mechanism illustrated herein includes a reel and clutch arrangement which is identical to that disclosed in U.S. Patent No. 3,044,724 to Mack C. Goodwin, issued July 17, 1962. As disclosed herein and as claimed in the Goodwin patent the tape supply apparatus provides a restoring force on the supply reel which initially increases as the angular displacement of the reel from its rest position increases but with the restoring force then assuming a constant magnitude to maintain a slight tension on the tape but without building up to an amount sufficient to break the tape.

To simplify any reference which might be had to the Bogan et al. application Serial No. 831,737, the same reference numerals are used in the present application as were used in the parent application. Referring now to the drawings and in particular to FIG. 1 there is illustrated the same machine as is disclosed in the Bogan et al. application. The machine is a combination calculating and perforating machine which is adapted to simultaneously record 22 columns of information on a strip of record material. As seen in FIG. 1, the machine has right and left side casings 13 and 14, a front casing 19, a panel cover 26, and a journal cover 28, said various panels and covers serving to enclose the operating mechanism of the machine. A cylinder lock controlled by a key 21 serves to prevent unauthorized access to the interior of the machine. A hinged plate 49 is provided in the front casing 19 so that access can be had to the chad box 50 (FIG. 2). The machine further has a validating chute 520 which is adapted to receive customers' receipts as well as a cash drawer 1570 access to which is controlled by a second cylinder lock and associated key 1598. The machine is provided with eleven columns of numerical keys 1100.

As described in detail in the Bogan et al. application, Serial No. 831,737, the add racks of the accounting machine portion of the combination calculating and perforating machine are mechanically coupled with a plurality of rotatable code disks having interposers extending therefrom and aligned with columns of punch pins. A power apparatus is provided for driving the code disks against the pins to cause the simultaneous recording of a large number of columns of information. The details of the specific perforating apparatus do not form part of the present invention and therefore only portions of said apparatus are illustrated in FIG. 2. Referring to FIG. 2 it will be seen that various frames including frames 30, 31, 32, 33 and 34 which are secured to the heavy base casting 10 are illustrated together with various parts which form the lower section of the machine. Also illustrated in FIG. 2 are the transfer gears 750 which are engageable by the lower geared sections of the add racks (not shown). The gears are supported on a main cross shaft 751 of a transfer gear section similar to that shown in FIGS. 60–62 of Butler U.S. Patent No. 2,629,549. The transfer gear section is supported between the punch frames 30 and 31 by means of the shaft 751 extending therebetween and also by additional cross shafts 752 which pass through intermediate supporting plates 753 to provide a rigid and stationary arrangement. Each of the intermediate plates 753 further serves to support the small cross shafts 754 having gears 755 thereon. The small gears on the shafts 754 serve to transmit motion from the gears 750 positioned on the left half of the shaft 751 to another set of transfer gears 757 rotatably supported on the right portion of shaft 751. The gears 757 are in turn engaged with further gears which are adapted to rotate and position code disks 761 (not shown). In this way the movement of the accounting machine add racks is transferred to the code disks in the perforating section of the machine.

There is also illustrated in FIG. 2 a portion of the main driveshaft 170 which is power-driven by means of an electric motor in a counterclockwise direction through approximately 180° during the first half of each cycle of operation of the mechanism and then clockwise back to its home position during the second half of each cycle of operation. Cams secured to the shaft 170 are adaptable to a pair of rollers carried by the arms 832R and 834R, supported by shaft 836, in a manner such that the code disks will be power-driven against the punch pins to cause the simultaneous recording of a large number of columns of information on the section of tape positioned in the punch throat 771 defined by the guide block 769 and the die block 770.

It will be seen in FIG. 2 that the machine is provided with a tape supply reel 900 on the right side thereof and a tape takeup or storage reel 941 on the left side of the machine. As seen in FIGS. 3 and 3A the supply reel 900 includes an inner disk 901 which is supported by four arms 902 by means of a supporting ring 903 disposed on the right side of the disk 901 and secured to the arms 902 by means of rivets which pass through the disks 901 into the ring 903. The arms 902 are rigidly secured to the enlarged right end of a tape supply shaft 904 which passes through a small supporting plate 906 and is held in position thereon by means of a clip 907 which fits in an annular groove provided in the end of shaft 904. A main supporting bearing 908 is rigidly attached to the plate 906 and encompasses the shaft 904 to provide a bearing surface for the shaft 904. The arms 902 further carry a bushing 909 which extends leftwardly and encompasses the bearing 908. It is thus seen that an arrangement is provided whereby the inner disk 901, shaft 904, and bushing 909 rotate as a single unit with the main bearing 908 being stationary on the plate 906 which is screwed to the frame 33. A sleeve 910 having a raised circumferential ridge 910A thereon is disposed about the bushing 909 and is rotatable with respect to the bushing 909. The diameter of the bushing 909 at its right end is equal to the outer diameter of the sleeve 910 and thus the sleeve 910 is held in place between the plate 906 and the raised right end of bushing 909. A first spring 911 having an inside diameter substantially larger than the outside diameter of the sleeve 910 encompasses said sleeve and has its left end secured to the plate 906 and its right end secured to the ridge 910A of the sleeve by means of the holes provided in the ridge 910A as seen in FIG. 3. The spring 911 is so wound that if the sleeve 910 is rotated clockwise the spring 911 will be compressed or wound more tightly about said sleeve.

A second spring which may be termed a clutch spring 912 encompasses the right end of the sleeve 910 and the right end of the bushing 909 and has its left or inner end secured to the ridge 910A on the sleeve. The inner diameter of clutch spring 912 when in an unstressed condition and removed from the bushing and sleeve has an inside diameter which is slightly less than the outside diameter of the sleeve and the right end of bushing 909. Thus when the clutch spring 912 is disposed about the sleeve and bushing as seen in FIG. 3A it is under tension and hence tends to grip the sleeve and the bushing. The clutch spring 912 is wound clockwise about the sleeve and bushing (starting at its inner end where it is secured to the ridge 910A) and thus clockwise rotation of the disk 901 and bushing 909 tends to wind the spring 912 more tightly about the bushing 909 and sleeve 910. Due to the grip of the spring on the bushing and the sleeve such clockwise rotation of the disk 901 carries the sleeve 910 therewith and hence places the main spring 911 under increased tension with spring 911 tending to urge the sleeve 910 and disk 901 counterclockwise. The restoring force provided by the spring 911 increases as the angle of displacement of the disk 901 increases and if means were not provided to release the clutch spring 912 the main spring 911 would continue to be wound more tightly about the sleeve 910 until a point would be reached at which no further rotation of the disk 901 would be permitted. To release the spring clutch 912 an upwardly and rightwardly extending abutment lug 906A is provided in the path of a radially extending portion 912A of the right end of spring 912. When the end 912A of clutch spring 912 engages the lug 906A the further clockwise rotation of bushing 909 in attempting to rotate the spring expands the right-hand coils of the clutch spring and therefore the grip of the clutch spring on the bushing 909 is decreased and the bushing 909 can rotate while the spring 912 and the sleeve 910 remain stationary. The main spring 911 of course tends to rotate the sleeve 910 and the clutch spring 912 attached thereto counterclockwise but any such counterclockwise rotation would move the extension 912A on the clutch spring away from the lug 906A and hence permit a regripping of the clutch spring with the bushing 909. Any such regripping of bushing 909 by the spring 912 would of course result in the continued clockwise rotation of disk 901 and bushing 909 carrying the spring 912 and sleeve 910 clockwise. It is thus seen that the continued clockwise rotation of disk 901 which occurs as the tape is removed from the supply reel causes first a tensioning of spring 911 to a predetermined point and then a slippage of clutch spring 912 on the bushing 909. As long as the tape is fed from the supply reel the extension 912A on the clutch spring remains in engagement of the lug 906A and hence the restoring force provided by the spring 911 remains substantially constant. As soon as the clockwise urge of the disk 901 caused by the removal of tape is decreased as a result of the end of a tape feed operation the spring 911 rotates the disk 901 counterclockwise back to home position and thereby rewinds a small amount of tape. In this way the tape always has a restoring force applied thereto. The amount of such restoring force can be adjusted by adjusting the relative positions of the ends of the two springs 911 and 912. Such adjustment is accomplished by placing the right end of spring 911 or the left end of spring 912 in a different one of the axial holes 910B provided in the ridge 910A on the sleeve. The restoring force could also be adjusted by having lug 906A movable to a number of fixed positions on the plate 906 so that the angle through which the clutch spring 912 must rotate prior to engagement of its extension 912A with the lug 906A could be adjusted.

The ring 903 which serves as part of the means for securing disk 901 to the arms 902 has a plurality of raised portions 903A which serve to grip the usual inner spool on which the tape is normally wound. Thus the spool of tape 905 is secured to the disk 901 with the lugs 903A preventing relative angular movement between the spool and the disk.

The present embodiment of the machine is illustrated for use with a conventional tape which is ⅞" wide but the machine is compatible of course with tapes of varying widths. Thus the supply reel is adapted to accommodate spools of tape of various widths by having an outer disk 913 positionable by varying distances to the right of the first disk 901. The disk 913 has an arbor 914 rigidly secured thereto which carries a cylinder 916 through the center thereof with said cylinder 916 having an enlarged end plate 916A screwed thereto. The left end of cylinder 916 has a larger outer diameter than the inner diameter of the left end of the arbor 914 and hence the cylinder 916 is not removable from the arbor. The outer diameter of the arbor 914 is the same as the outside diameter of ring 903 and thus serves to support the spool of tape.

A small compression spring 917 is disposed about the cylinder 916 between the end plate 916A and the left end of the arbor 914 and hence when the cylinder 916 is connected to the right end of shaft 904 the spring 917 urges the outer disk 913 and arbor 914 leftwardly toward engagement with the right edge of the spool of tape. A small four-armed leaf spring 918 is screwed to the right end of the shaft 904 and has flared ends which are engageable with the inside of the cylinder 916 which has an axial opening of one diameter in its right-hand half and smaller diameter in its left-hand half to thereby provide a ridge 916B on the inner surface thereof. A small button 919 extends to the right through the end plate 916A and is provided with a shoulder portion which engages the plate 916A to prevent removal of the button from within the cylinder 916. The left end of the button 919 is in the form of a hollow shaft with a beveled surface at the left end which is engageable with the leaf spring 918. The spring 918 serves to hold the cylinder 916 on the shaft 904 through its engagement with the ridge 916B when the cylinder is pushed leftwardly over the end of the shaft 904. Spring 918 further serves through its engagement with the left end of the button 919 to maintain the button 919 in its FIG. 3A position. Upon pushing the button 919 leftwardly the left end thereof serves as a cam surface to release the spring 918 from the ridge 916B on the inside of cylinder 916 and hence permits removal of the cylinder and outer disk 913 from the shaft 904. In this way the space between the inner and outer disks 901 and 913 is variable in accordance with the width of the tape used with the machine.

*Punched Tape Storage*

The tape is fed or removed from the bottom of the tape supply reel and is fed forwardly and upwardly over the top of a first upper guide roller 930 (FIG. 2) supported by a bracket extending rightwardly from the frame 33, down and around a first lower guide roller 931 extending rightwardly from the frame 33 at an angle of approximately 45° to the horizontal, leftwardly from roller 931 in front of first and second feed rollers 932 and 933 secured to the base frame and behind movable stripping roller 934, through the punch opening 771, around the forward perphery of a feed drum 990, in front of a first stationary takeup roller 936, behind a movable takeup roller 937, in front of a second stationary takeup roller 938, around and up behind a second lower guide roller 939 extending leftwardly from the frame 32 at an angle of approximately 45°, over the top of a second upper guide roller 940 extending leftwardly from the frame 32, and finally downwardly and rearwardly to the bottom of the takeup reel 941. As seen in FIG. 4 the takeup reel includes an outer disk 942 having rightwardly extending lugs 942A which are engageable with mating spring clips 943 carried by the arms 944A of a takeup arbor 944 rigidly attached to the left end of a first bushing 946 carried on a stationary shaft 947 extending leftwardly from a small bracket 948 secured to frame 32.

A second bushing 949 having an outer diameter equal to that of the first bushing 946 is rotatably supported on the shaft 947 and has secured to its right end a first pulley 950 which is adapted to be rotated counterclockwise each machine cycle by means to be presently described. A clip 951 fits an annular groove on the left end of shaft 947 to hold the bushings in place thereon with the pulley 950 immediately adjacent a shoulder 952 on the right end of the shaft 947. The arbor arms 944A carry a second disk 953 at their right ends to form a space between said first and second disks for receiving the perforated tape, one of said arms 944A having a horizontal slot therein for receiving the end of the tape. The lugs 942A are each provided with a plurality of annular grooves engageable by said spring clips in a manner such that the clips can grip the lugs at various points to permit the disk 942 to be held varying distances to the left of the disk 953 for the accommodation of tapes of various widths.

A toothed detent wheel 954 is supported on the bushing 949 and has connected thereto the right end of a coil spring 956 which extends leftwardly in clockwise loops about the bushings 946 and 949 with its left end abutting the disk 953. This spring 956 serves to urge the detent wheel 954 to the right into frictional engagement with the left side surface of the pulley 950. The inside diameter of the spring 956 is slightly greater than that of the bushings but due to the compression of the spring between the wheel 954 and the disk 953 the left end of the spring is maintained under constant pressure against the inner surface of the disk 953. The friction between the wheel 954 and the bushing and pulley 950 causes the detent wheel to normally rotate in response to rotation of the pulley and hence upon such rotation of the wheel in a counterclockwise direction the spring 956 becomes more tightly wrapped about the two bushings 946 and 949 and hence produces a snubbing action which together with the engagement of the left end of spring 956 with disk 953 causes the two bushings to rotate together. Thus the bushing 946 rotates in response to rotation of the pulley 950 as long as the detent wheel 954 is free for counterclockwise rotation to cause the above-referred to snubbing action of the spring.

An endless rubber belt 957 passes around the first pulley 950 and around a second pulley 958 which is formed as part of a bushing 959 free on the left end of the main machine driveshaft 170. An end bushing 960 pinned to the shaft 170 to the left of bushing 959 and pulley 958 has an outer diameter equal to the outer diameter of bushing 959. A stationary bushing 961 secured to the frames 32 and 47 also encompasses the shaft 170 and has an outer diameter equal to that of the pulley bushing 959. A first coil spring 962 having an inside diameter which is smaller than the outside diameter of bushings 959 and 960 when the spring is in an unstressed condition is disposed about the bushings 959 and 960, being held between the pulley 958 and the left end of bushing 960 by means of the raised end of an arm 979 secured to the left end of bushing 960. Starting with the end of the spring 962 which is adjacent the pulley 958 the spring is wound in clockwise fashion about the bushings 959 and 960 and therefore upon the counterclockwise rotation of the main power shaft 170 during the first half of a machine cycle the spring 962 tends to expand and be more loosely wound about the bushings and therefore does not drive the pulley 958 during the first half of each machine cycle. During the second half of each machine cycle when the main shaft 170 is rotating clockwise to its home position the spring 962 tends to be more tightly wound and therefore provides clockwise force on the bushing 959. To prevent any counterclockwise rotation of the bushing 959 and pulley 958 which might occur during the first half of a machine cycle as the shaft 170 is rotating counterclockwise a second coil spring 963 also having an inner diameter smaller than the outer diameter of the bushings is disposed about the bushings 959 and 961 between the pulley 958 and the main frame 32 and is wound in a counterclockwise direction about the bushings starting with the right-hand end of the spring. Thus any counterclockwise rotation of pulley 958 and bushing 959 during the first half of each machine cycle tends to tighten the second coil spring 963 and therefore prevent any slippage between the spring and the bushings and the pulley remains stationary. However, during the second half of each machine cycle when the first spring 962 produces the clockwise force on the bushing 959 the second coil spring 963 will tend to expand on the bushings 959 and 961 and therefore allow the pulley to be driven clockwise. Thus a ratchet effect is obtained with the pulley 958 being rocked clockwise during the second half of each machine cycle. The belt 957 is twisted once between the two pulleys 950 and 958 and therefore the clockwise movement of pulley 958 causes counterclockwise rotation of pulley 950. As previously set forth such counterclockwise rotation of the first pulley 950 carries the detent wheel 954 counterclockwise and thereby through the spring 956 and the bushings 946 and 949 causes counterclockwise rotation of the takeup reel 941. The diameters of the pulleys and of the arbor 944 is such that when the first coil of tape is being wound about the arbor 944 the pulley 950 will be rotated through a sufficiently large angle to insure an adequate rotation of the takeup reel. As the amount of tape wound upon the takeup reel increases the angular displacement of the takeup reel during each machine cycle is decreased for the winding thereon of a constant amount of tape during each machine cycle. The pulley 950, however, is rotated through a constant angle counterclockwise during each machine cycle and therefore as the amount of tape increases the tension of the tape itself serves to prevent any over rotation of the takeup reel with the spring coupling provided by the coil spring 956 being free at its left end between the bushings 946 and 949 allowing slippage and relative movement of the driving pulley 950 and the takeup reel 941.

It is thus seen that the takeup reel 941 is normally provided with a counterclockwise urge during the second half of each machine cycle.

During nonpunching machine cycles, such as those described in the above Bogan et al. application, the tape is nonfed and therefore it is desirable to prevent the application of a counterclockwise urge to the takeup reel 941 which might tend to break the tape. Accordingly, means is provided for holding the detent wheel 954 stationary during a nonpunch operation and as a result the necessary snubbing action of the spring 956 never occurs. Hence the bushing 949 and pulley 950 rotate independently of the bushing 946. The means for holding wheel 954 stationary during a nonpunch operation is seen in FIG. 5 and includes a detent lever 966 having a leftwardly extending lug 966A which is engageable with the teeth of the detent wheel, said lever being pivoted on a stud 967 extending leftwardly from the frame 32. The lever 966 is in the form of a small bellcrank having a downwardly extending arm which carries a leftwardly extending stud 966B which is engageable by a small two-armed lever 968 pivoted on a stud 969 extending leftwardly from the frame 32. The lower and forward arm of the lever 969 underlies a rightwardly extending stud 970A on the end of a crank 970 pinned to the left end of a nonpunch shaft 808 on the left side of the frame 32. As described in Serial No. 831,737 the shaft 808 is rocked clockwise during the early part of a nonpunch operation and therefore the stud 970A rocks lever 969 counterclockwise to bring its upper rear arm into engagement with the leftwardly extending stud 966B on the bellcrank lever 966 rocking said bellcrank lever clockwise to bring its lug 966A into engagement with the teeth on the detent wheel 954. When the detent lever is thusly engaged with the detent wheel the detent wheel is prevented from moving counterclockwise and therefore the takeup reel 941 is not provided with the usual counterclockwise drive during the second half of each cycle. A small toggle spring 971 encompasses the outer end of the leftwardly extending stud 966B and also a stationary stud 972 extending leftwardly from the frame 32. This small spring serves to yieldingly hold the bellcrank lever 966 in either of two positions, one of which is in its position of engagement with the detent wheel.

The bellcrank lever 966 is further provided with a forwardly extending arm 966C which is in the form of a cam surface which is engageable by a leftwardly extending stud 973 on a lever 974 supported on the left side of the frame 32 by a cross shaft 975 which extends between the frames 32 and 30. A spring 977 connected to the forwardly extending arm on lever 974 and to a stationary stud 978 on the frame 32 tends to hold the lever 974 in a position slightly clockwise of that in which it is shown in FIG. 5. A power arm 979 pinned to the left end of the main driveshaft 170 and to the bushing 960 in FIG. 4 carries a rightwardly extending roller 980 which rides in a cam slot 981A provided in a cam arm 981 which is pinned to the left end of the cross shaft 975. This roller 980 extends to the right by a sufficient distance to be positioned rearwardly of the upper end of lever 974 and therefore when the main driveshaft 170 is in its home position the roller 980 will hold the lever 974 in the counterclockwise position of FIG. 5 with its leftwardly extending stud 973 in engagement with the bellcrank lever 965 holding the bellcrank lever 966 counterclockwise out of engagement with the detent wheel 954. During the early part of each machine cycle the power arm 979 moves counterclockwise away from the lever 974 and therefore the bellcrank lever 966 is free to move into engagement with the detent wheel 954, although it does not normally move into such engagement since the toggle spring 971 holds it in its disengaged counterclockwise positon.

As previously mentioned the shaft 808 is rocked clockwise during the early part of a nonpunch machine operation and therefore since the roller 980 has moved away from lever 974 the clockwise movement of the shaft 808 is able to rock the detent bellcrank 966 clockwise into engagement with the detent wheel 954 to prevent rotation thereof. At the end of any nonpunch cycle of operation the shaft 808 is returned to its counterclockwise home position thereby releasing the detent bellcrank 966 for movement to its counterclockwise position. Thus the engagement of the roller 980 with the upper end of lever 974 brings the stud 973 into engagement with the forward cam surface on the detent bellcrank and moves the lever 965 to its FIG. 5 position. It is thus seen that the detent bellcrank lever 966 is normally disengaged from the detent wheel 954 but is brought into engagement therewith during the early part of a nonpunch machine operation and is removed from engagement therewith near the end of a nonpunch machine operation.

*Tape Feed*

The tape is pulled leftwardly by the tape feed drum during the last half of each machine cycle following the punching operation which occurs near the end of the first half cycle, and since the machine simultaneously punches a large number of columns of information a long strip of tape must be fed in a relatively short period of time. To facilitate the rapid feeding of the tape during the second half of a machine cycle means are provided for stripping the necessary amount of tape from the supply reel during the first half of the machine cycle and storing said amount in a loop in anticipation of the feeding operation performed by the tape feed drum. Thus when the feed drum is rotated during the second half cycle it is esentially moving only the length of tape which is to be punched on a subsequent operation and not the entire tape supply reel. This reduces the load on the feed drum and hence reduces the tendency for tearing of the tape by the radial pins on the feed drum which extend through the feed holes punched in the tape.

The mechanism for stripping the tape from the supply reel during the first half of a machine cycle is shown in FIGS. 2 and 6 and includes the movable stripper roller 934 which is positioned vertically in front of the tape between the two stationary rollers 932 and 933 which are positioned to the rear of the tape. As seen in FIGS. 6 and 2 the stationary feed rollers 932 and 933 are carried on vertical studs secured to the bottom frame 37 while the movable roller 934 is carried at the forward end of a slide 982 which is slidable forwardly and rearwardly on the frame 37. The forward end of the slide 982 has a slot therein to provide an arrangement in which the position of the roller 934 thereon can be adjusted by means of the washer positioned beneath the slide 982 and connected to the bolt which passes through the center of the roller. The right rear side of the slide 982 is bent upwardly and is slotted in the manner shown in FIG. 6 to provide a cam slot 982B which is engaged by a leftwardly extending stud roller 984A on the left arm of a bellcrank 984 rotatably carried on a stationary cross shaft 986 which is supported by a bracket on the punch frame 31 at its left end and by the frame 33 at its right end. The bellcrank 984 has a rearwardly extending arm which is connected by means of a pitman 987 to the end of a power arm 988 fixed to the right end of the main driveshaft 170. When the machine is in its home condition the slide 982 and hence the movable roller 934 is in the most forward position but during the first half of a machine cycle the counterclockwise rotation of the main driveshaft 170 pulls the pitman 987 upward and thereby through the counterclockwise rocking of bellcrank 984 pulls the slide 982 rearwardly to its position indicated by dotted lines in FIG. 6. Since the stationary rollers 932 and 933 are secured to the base plate the movable roller 934 will pass between the stationary rollers and hence pull the tape rearwardly to form a loop. As will be described presently the tape feed drum is allowed only a slight counterclockwise movement during the first half of the machine cycle and is then locked against further counterclockwise movement. Hence the rearward travel of the movable roller 934 pulls the tape by a small amount to the right out of the punch blocks and strips a predetermined length of tape from the supply reel 900 to store it in the form of a loop. The amount of tape stripped is determined by the rearward travel of the roller 934 which is in turn fixed to a predetermined distance by the rotation of bellcrank 984. The rear arm of bellcrank 984 has a plurality of pin holes therein for receiving the lower end of the pitman 987 and thus the distance of rearward travel of slide 982 can be varied by connecting the pitman 987 to the bellcrank 984 by placing the connecting pin in a different one of the plurality of holes. During the second half of a machine cycle the power arm 988 returns clockwise to its home position and therefore returns the roller 934 to its forward position. During the forward travel of the roller 934 the feed drum is rotated and thus the previously stripped tape is advanced into the punch opening. If the machine operation is a nonpunch operation the restoring force provided by the spring 911 in the tape supply mechanism serves to take up the loop and replace it on the supply reel.

The tape feed drum 990 (FIGS. 2 and 7) is positioned to the left of the punching mechanism and is provided with a plurality of tape feed pins 991 extending radially therefrom and about the circumference thereof in a section of the drum having a reduced diameter as seen in FIG. 7. The drum is secured to a rotatable shaft 992 by means of the set screws 993 and therefore the rotation of the drum is controlled by the rotation of the shaft 992. The lower end of shaft 992 is reduced in diameter and passes through a bearing 994 in the base casting and further carries a control cam 996 below said bearing 994. A pin 997 secures the control cam 996 to the shaft, said control cam having two cam surfaces each of which occupies one-half of the circumference of the cam as seen in FIG. 7. A second bearingf 998 is supported by a lower section of the base casting and is pressed on the shaft 992 to serve as a bearing support therefor. A coil spring 999 intermediate the lower bearing 998 and a drive gear 1000 serves to urge the drive gear 1000 upwardly to maintain its top surface in engagement with the bottom surface of the control cam 996. The upper surface of the gear 1000 is in the form of a two toothed cam 1001 which is adaptable to a similar cam 1002 on the bottom surface of the control cam 996. These two cams 1001 and 1002 serve as a unidirectional clutch and therefore may be termed clutch elements, the arrangement between the two clutch elements being such that when the gear 1000 is rotated clockwise the element 1001 grips the clutch element 1002 positively and drives the shaft 992 clockwise but upon counterclockwise rotation of the gear 1000 the two cam surfaces 1001 and 1002 move with respect to each other and therefore the shaft 992 can be prevented from rotating while the gear 1000 is rotated. This relative movement between the two clutch elements 1001 and 1002 merely cams the gear 1000 down against the upward urge of the spring 999. Thus a unidirectional drive is provided for the shaft 992 in response to a bidirectional drive of the gear 1000.

A geared slide 1003 slidably supported on a small plate 1004 on the base casting by means of stationary rollers 1005 extending upwardly from the frame 1004 through the slots provided in the geared slide has a geared edge along its front right side which is constantly engaged with the gear 1000 and therefore when the slide is moved forwardly during the first half of each machine cycle the gear 1000 is rotated counterclockwise and upon rearward movement of the slide during the second half of a machine cycle the gear 1000 is rotated clockwise to advance the tape feed drum 990. The right rear edge of the slide 1003 is turned upwardly (FIGS. 8 and 9) and carries a leftwardly extending roller 1006 which is normally engaged in the forked end of a lever 1007 carried by a small cross shaft 1008 extending between the frames 30 and 29. A pitman 1009 connected to the upper end of lever 1007 and to cam 369 secured to the main driveshaft 170 causes clockwise rotation of lever 1007 during the first half of each machine cycle and counterclockwise rotation during the second half of each machine cycle. Thus the gear 1000 is rotated counterclockwise during the first half of a machine cycle during which time the control cam 996 pinned to the shaft 992 is limited against an adjustment screw 1011 (FIG. 7) supported by an adjustment block 1012 rotatably supported on a shaft 1113 which passes through the forward roller 1005 and is secured beneath the base casting by a nut and washer. The upper end of shaft 1113 is held by an upper section of base casting as seen in FIG. 7. A spring 1014 connected to a rearwardly extending stud 1016 on the block 1012 and to a stud 1017 extending upwardly from the base serves to urge the block 1012 clockwise to maintain the right end of the adjustment screw 1011 in engagement with the control cam 996. The junction between the high point on one of the cam surfaces with the low point on the other of the cam surfaces of the control cam is discontinuous and hence an abutting surface is provided which when engaged with the adjustment screw 1011 prevents counterclockwise movement of the shaft 992 and hence of the feed drum. The adjustment screw 1011 is provided with a jam nut 1018 and therefore once it has been placed in the desired position with respect to the control cam 996 it can be locked in position in the adjustment block 1012.

When feeding a large increment of tape as in the present machine it is essential that the feeding operation be extremely accurate in order that the space between adjacent columns of information on the tape remains uniform from one group of columns to the next and also to insure uniform spacing of the feed holes. This normally presents a serious problem when the tape is being advanced by a large amount during a short time interval since the tape is moving very rapidly and then brought to a stop. This problem is overcome in the present machine by overfeeding the tape during its leftward travel following a punching operation and then returning it by a short distance to the right to a very accurate position immediately prior to the punching operation which occurs during the next operation. The geared rack 1003 is so adjusted that during its rearward travel it rotates the shaft 992 through an angle which is greater than 180° and thus during such clockwise rotation of the shaft 992 the control cam 996 rotates to a position in which the adjustment screw 1011 first rides up to the high point of one of the cam surfaces and is then permitted to drop off the end thereof under the urge of spring 1014 to the low point of the other cam surface. This occurs during the second half of a machine cycle. As previously mentioned the stripping roller 934 moves rearwardly during the first half of a machine cycle and therefore tends to pull the tape rightwardly through the punch block opening, such rightward movement of the tape corresponding to counterclockwise rotation of the feed drum being permitted until the flat portion of the control cam abuts the adjustment screw 1011 and any further rightward movement of the tape is prevented. Thus it is seen that the shaft 992 and hence the feed drum 990 is rotated through an angle which is greater than 180° during the second half of a machine cycle following the punching operation to thereby advance the tape to the left, and then during the first half of the next machine cycle the tape is moved a short distance to the right until the set screw 1011 engages the abutment surface on the control cam 996. The net rotation of the drum is therefore exactly 180°.

The number of pins 991 on the drum 990 is related to the number of columns of information being punched and in the present apparatus this relationship is in the ratio of two to one. That is, there are 44 radial feed pins 991 on the drum 990 and 22 columns of punch pins in the punch mechanism. Therefore since the drum 990 is rotated through an angle greater than 180° during the last half of a machine cycle clockwise and is then rotated counterclockwise by the pull of the stripping roller 934 during the first half of the next machine cycle by an angle which is exactly equal to the angle of clockwise rotation minus 180°, it is seen that the net clockwise rotation is exactly the distance or space occupied by the 22 columns of information. Since the diametrically opposed abutment surfaces on the control cam 996 can be very accurately produced to be 180° apart, the net rotation of the feed drum is very accurate.

This tape feed arrangement has a further advantage in that if it is desired to punch a different number of columns of information the number of code disks can be changed to leave the required number in the machine for punching the selected number of columns of information and the tape feed drum 990 replaced by another drum having a different number of radial pins extending therefrom which are each spaced from adjacent pins by a distance corresponding to the distance between adjacent punched feed holes. If a single screw 1011 and the two-surfaced control cam 996 is used the number of pins on the drum is exactly equal to twice the number of columns of information being punched. It is of course possible to change the number of abutting surfaces on the control cam 996 and/or the number of screws 1011 with a corresponding change in the relationship between the number of pins on the drum and the number of columns of information being punched together with a change in the angle of clockwise rotation imparted to the gear 1000. The relationship between the number of columns of information punched on the tape and the angle through which the feed drum 990 is rotated may be described as follows:

if:

$N$=the number of columns being punched
$s$=the distance between the centers of adjacent feed holes and between the centers of adjacent feed pins as measured along the circumference of the circle defined by the center of the tape when disposed about the drum with the pins engaged in the feed holes
$n$=the number of pins extending radially from the drum
$a$=the angle in degrees of clockwise rotation of the drum during the second half machine cycle then:

$$a=\frac{360N}{n}+K$$

where $K$=a constant which is equal to the number of degrees of counterclockwise rotation of the drum during the first half of a machine cycle.

When the number of abutting surfaces spaced equidistant apart on the control cam is equal to $b$ and a single set screw 1011 is used then:

$$K<\frac{360}{b}$$

$$a=\frac{360}{b}+K^\circ$$

$$n=bN$$

and the circumference of the drum would be equal to $sn$.

To hold the perforated tape in engagement with the feed pins 991 on the drum 990 a pair of pressure rollers 1020 and 1021 (FIGS. 7, 9, 10) are normally urged toward the drum 990 to hold the tape in engagement therewith. Each of these pressure rollers is provided with a section having a reduced diameter to accommodate the feed pins 991. The roller 1020 is carried by means of an upwardly extending stud 1022 attached to a small plate 1023 held by means of a pin 1024 to an arm 1025 which is geared at its forward edge and which encompasses the shaft 992. This arm 1025 lies on top of the bottom casting and its forward end is constantly in mesh with a second geared arm 1026 pivoted by means of a bolt 1027 to a raised part of the bottom casting. Said bolt 1027 carries a spacing element 1028 thereon for holding a pair of plates 1029 and 1030 in fixed space relationship for carrying the second pressure roller 1021 and also serves to hold said plates to the arm 1026. An adjustment screw 1031 passes through an adjustment slot in the plate 1030 and is screwed into the arm 1026 to hold the plates 1030 and 1029 in a fixed position with respect to the arm 1026. A toggle spring 1032 having one end connected to an upstanding stud 1033 on the small plate 1030 and its other end connected to a stationary stud 1034 extending upwardly from the bottom casting serves to urge the plates 1030 and 1029 counterclockwise about the bolt 1027 to thereby maintain the roller 1021 in engagement with the tape and drum.

The pin 1024 which passes through the rear arms of the small plate 1023 to rotatably support the plate 1023 on arm 1025 has a coil spring 1036 (FIG. 8) wound thereabout with the upper end of the spring 1036 being secured to the pin 1024 and the lower end extending rearwardly through a hole in the vertical portion of the plate 1023 as seen in FIG. 8. The pin 1024 is rigidly secured to the arm 1025 and the spring 1036 is wound counterclockwise starting at its upper end about the stud 1024 in a manner such that it tends to urge the plate 1023 counterclockwise about the pin 1024 to maintain the pressure roller 1020 in engagement with the tape and feed drum. The arms 1025 and 1026 are normally held in their FIG. 10 positions by means of a small latch 1037 screwed to the front of the frame 34 and provided with a notch 1037A which engages the forward end of the arm 1026 which passes through the front of frame 34. A spring 1038 connected to the latch 1037 and to a stud on the base frame serves to urge latch 1037 clockwise into engagement with the arm 1026.

When it is necessary to change the tape on the machine the latch 1037 is moved counterclockwise and the arm 1026 is manually pivoted clockwise. Since the set screw 1031 holds the plate 1030 to arm 1026 the pressure roller 1021 is swung in a clockwise arc away from the feed drum. This brings the stud 1033 to which the toggle spring 1032 is connected to a proper position with respect to stud 1034 to cause spring 1032 to hold the roller 1021 out of engagement with the feed drum. The geared connection between arms 1025 and 1026 causes counterclockwise rotation of arm 1025 about shaft 992 in response to the clockwise rotation of arm 1026 about bolt 1027 and hence the plate 1023 is moved in a counterclockwise arc while the spring 1036 maintains the pressure roller 1020 in engagement with the drum 990. The continued rotation of arm 1025 brings the rearwardly extending portion 1023A of the plate 1023 into abutting engagement with an upwardly extending lug 1039A on a pitman 1039 pinned to the arm 1026 and to the right end of a lever 1040 which is in turn rotatably secured beneath the frame 36 by a vertical stud 1041. This engagement of the rear end of the plate 1023 with the lug 1039A causes clockwise rotation of the plate 1023 with respect to the arm 1025 during the continued counterclockwise rotation of the arm 1025 and hence the roller 1020 is moved away from the feed drum 990. Thus the tape can be removed from its position about the drum 990 or a new tape can be positioned about the drum 990 as seen in FIGS. 10 and 10A. The vertical stud 1041 which holds the lever 1040 in place extends up through the frame 36 and further serves to support the first stationary takeup roller 936.

The tape must not be advanced during a machine cycle which is a nonpunch operation and therefore means is provided for disabling the drive of the feed drum 990 during each such nonpunch operation. As seen in FIG. 7 the forked end of a bail 1042 pivoted on a shaft 1043 supported by the frames 29 and 30 encompasses the shaft 992 between the control cam 996 and the driving gear 1000. The bail 1042 is secured by a bolt 1044 to the forward end of a lever 1046 (FIGS. 7 and 8) pivoted on the shaft 1043 and provided with a rightwardly extending stud 1046A which is engaged in the forked end of a lever 1047 pivoted on the shaft 1008 and connected by pitman 1048 to an arm 1049 pinned to the nonpunch shaft 808. As previously mentioned the nonpunch shaft 808 is normally in its most counterclockwise position as seen in FIG. 8 but in response to a nonpunch operation is rocked clockwise during the early part of the nonpunch cycle and therefore through the arm 1049 pushes the pitman 1048 upwardly to rock lever 1047 counterclockwise, lever 1046 clockwise, and hence bring the forked end of the bail 1042 downwardly. Such downward movement of the rear forked end of the bail 1042 urges the gear 1000 downwardly away from the control cam 996 to separate the two clutch elements 1001—1002 and thereby prevent rotation of the shaft 992 in response to rotation of gear 1000. Therefore the feed drum 990 remains stationary during a nonpunch machine operation.

The machine is provided with two signal lights for providing an indication of any break which might occur in the punched tape. As seen in the schematic diagram of FIG. 2A a first light 1050 on the keyboard is wired in series with a first normally open switch 1052 and a second light 1051 on the keyboard is wired in series with a second normally open switch 1053. The switch 1052 is supported beneath the frame 36 and as seen in FIG. 10 is provided with a control member 1052A which extends forward and is in engagement with the rear end of the arm 1040A of lever 1040 which as previously mentioned is pivoted at 1041 beneath the frame 36. The left front edge of frame 36 is in the form of two vertical arms 1054 and 1056 which are positioned behind the punched tape as it passes from the feed drum to the takeup reel. The left end of the arm 1040A is similarly bent upward to provide a vertical arm 1057 which is positioned in front of the tape and between the two arms 1054 and 1056. A spring 1058 connected to the lever 1040 urges the lever 1040 clockwise and hence tends to move the vertical arm 1057 rearward, such rearward movement being prevented by the punched tape and the stationary arms 1054 and 1056. If a break occurs in the tape between the drum and the takeup reel the vertical arm 1057 will be allowed to move rearwardly and hence through its engagement with the control element 1052A of the switch 1052 close the circuit for the first light 1050. The switch 1053 for the second light 1051 is controlled in an identical manner by a vertical arm 1059 on a lever 1060 (FIG. 2) pivoted beneath the frame 37 and which is urged clockwise by a small spring.

As seen in FIGS. 10 and 10A the clockwise movement of the arm 1026 from its FIG. 10 to its FIG. 10A position serves to move the lever 1040 counterclockwise and hence bring the vertical arm 1057 to the forward position of FIG. 10A while a new tape is being positioned in the machine. Such counterclockwise movement of the lever 1040 serves to move a link 1061 pinned to the forward arm 1040B to the right and therefore since the right end of the link 1061 is pinned to the forward arm 1060B of the lever 1060 (FIG. 2) which controls the second switch 1053 the lever 1060 will also be moved counterclockwise to facilitate the positioning of the new tape. There is a sufficient amount of lost motion between the link 1061 and the levers 1040 and 1060 to permit the levers 1040 and 1060 to operate independently in their control of switches 1052 and 1053 and still be simultaneously controlled by the lever 1026.

As seen in FIG. 2 the electrical lead-in wire 1062 for the machine goes to a terminal strip 1063 secured to the base casting near the left rear corner of the machine and the wires which carry the current for the motor and the indicator lights are then secured to the terminals on the strip 1063. The circuit for the motor 100 includes a disconnect plug 1064 to facilitate removal of the upper section of the machine which includes the motor 100 from the lower section. In a similar manner the circuit for the indicator lights includes a second disconnect plug 1065 to facilitate the disconnecting of the switches secured to the frames 36 and 37 from the lights 1050 and 1051 carried in the machine keyboard. Although the present embodiment of the machine does not include means for disabling the electric motor in the event of a break in the tape it is obvious that either or both of the switches 1052 and 1053 could be utilized to disable the motor in the event of a tape break. For example, the section of the wiring for the two switches which is common to both switches could include a solenoid which would be operative upon energization to open a normally closed switch connected serially with the motor circuit.

Since the tape is first moved to the left and is then returned to the right by a short distance prior to the punching operation the storage reel would normally have to undergo a slight reverse rotation. To avoid this reverse rotation a roller 937 (FIG. 5) is positioned in front of the tape between the stationary rollers 936 and 938 and is moved forwardly during the first half of each machine cycle to permit the tape to move in a straight path from the roller 936 to the roller 938, and then during the second half of each machine cycle it is moved rearwardly to form a small loop of tape. Since the roller 937 moves forward at the same time as the stripping roller is moving rearward it is seen that the amount of tape needed for the small amount of rightward movement of tape into the punch throat is supplied by this small loop.

The means for reciprocating the movable roller 937 first forwardly and then rearwardly during each machine cycle includes a downwardly extending arm 1080 (FIG. 5) pinned to the previously mentioned shaft 975. The lower end of the power arm 1080 is provided with a rightwardly extending stud roller 1080A which is engaged in the forked end of an upstanding portion 1081A of a slide 1081 on which the roller 937 is carried. The slide 1081 is slidably supported on the frame 36 in a manner substantially the same as that in which the stripping slide 982 is supported on the frame 37 and thus since the shaft 975 is rotated clockwise during the first half of each machine cycle and counterclockwise during the second half of each machine cycle it is seen that the slide 1081 and roller 937 are moved forwardly during the first half and rearwardly during the second half of each machine cycle.

There has thus been described an improved perforating apparatus and in particular an improved tape feed apparatus adapted for use in combination with a recording apparatus wherein a large number of columns of information are simultaneously recorded.

What is claimed is:

1. A perforating apparatus comprising in combination: a tape supply reel; a tape storage reel; means guiding the tape along a path from said supply reel to said storage reel; punching means intermediate said supply reel and said storage reel operative to simultaneously punch a plurality of columns of holes in the tape; a tape feed drum between said punching means and said storage reel; tape stripping means intermediate said punching means and said supply reel; power means operative to energize said tape stripping means during a first time interval to remove a predetermined length of tape from said supply reel; means operative during a second time interval to energize said tape feed drum to advance said predetermined length of tape to said punching means; and means responsive to the operation of said tape stripping means during said first time interval to permit rotation of said feed drum through a predetermined angle in response to operation of said stripping means.

2. A cyclically operative tape perforating mechanism comprising in combination: punching means operative during a first time interval in the machine cycle to simultaneously punch a plurality of columns of holes in the tape; a tape feed drum having means engaged with selected ones of said holes; power means operative to rotate said drum to advance said tape in a first direction by a distance equal to $(Ns+k)$ subsequent to said first time interval, where N equals the number of columns of holes, $s$ equals the distance between the centers of adjacent columns of holes and $k$ equals a fixed distance; and means operative prior to said first time interval to move said tape in a second direction opposite to said first direction by a distance equal to $k$.

3. In a perforating machine operative to punch N columns of holes in a record material at substantially the same time with the centers of adjacent columns separated by a distance $s$, a feed mechanism for the material comprising in combination: a feed drum having $n$ feed pins spaced $s$ distance apart about its circumference and extending radially therefrom for engagement with selected ones of said holes; means for rotating said drum during one time interval in a first direction through an angle of $$\left(\frac{360N}{n}+K\right) \text{ degrees}$$

where K is a constant; and means for rotating said drum during another time interval in a second direction opposite to said first direction through an angle of K degrees.

4. A tape feed apparatus for a machine having a punching mechanism for simultaneously punching a plurality of columns of holes in the tape, comprising: tape supply means; tape storage means; a feed drum intermediate said punching mechanism and said storage means engaged with said tape; first and second tape guide rollers intermediate said punching mechanism and said supply means disposed on opposite sides of the tape passing from said supply means to said punching mechanism; power means operative to produce a first relative movement between said rollers to remove a predetermined amount of tape from said supply means and to rotate said drum in a first direction; means limiting the amount of rotation of said drum in said first direction; and power means operative to produce a second relative movement between said rollers opposite to said first relative movement and to simultaneously rotate said drum in a second direction opposite to said first direction.

5. A tape feed mechanism for a machine operative to punch N columns of holes $s$ units apart comprising: a tape supply reel; a tape storage reel; means guiding the tape from said supply reel to said storage reel; a rotatable feed cylinder having $n$ feed pins extending radially therefrom; means maintaining said tape engaged with the pins on said cylinder; first and second stationary rollers disposed adjacent to and on one side of the tape between said supply reel and said cylinder; a third roller disposed on the other side of said tape between said supply reel and said cylinder having a first position and movable in a plane between said first and second rollers to a second position; means operative to move said third roller from said first to said second position to form a loop of tape and to rotate said cylinder in a first direction; means limiting the rotation of said cylinder in said first direction to an angle of $K$ degrees; and means operative to move said third roller from said second to said first position and to simultaneously rotate said cylinder in a direction opposite to said first direction through an angle of $$\left(\frac{360N}{n}+K\right) \text{ degrees}$$

References Cited in the file of this patent

UNITED STATES PATENTS

| | | |
|---|---|---|
| 2,189,027 | Fuller | Feb. 6, 1940 |
| 3,081,014 | Anderson et al. | Mar. 12, 1963 |